No. 817,942. PATENTED APR. 17, 1906.
J. W. TAPP.
BRAKE.
APPLICATION FILED JAN. 20, 1905. RENEWED OCT. 18, 1905.
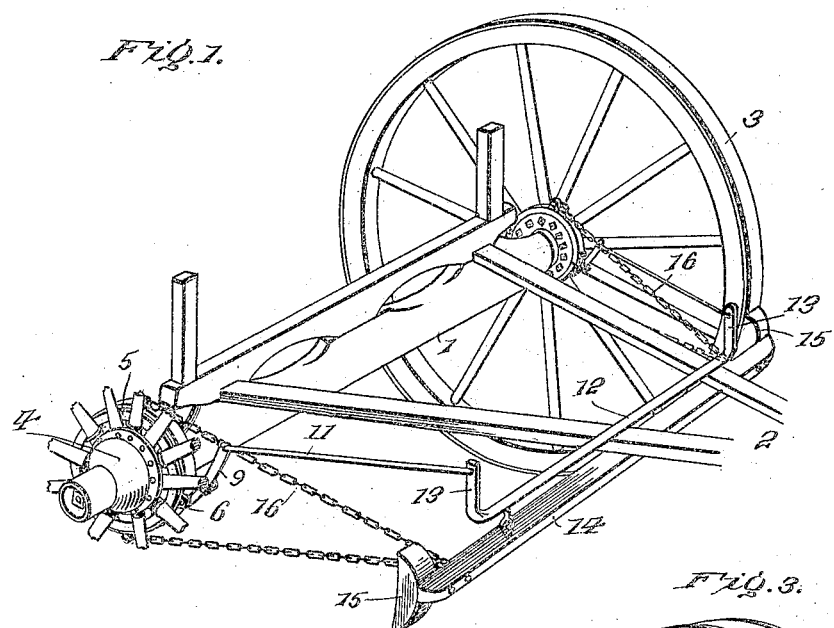
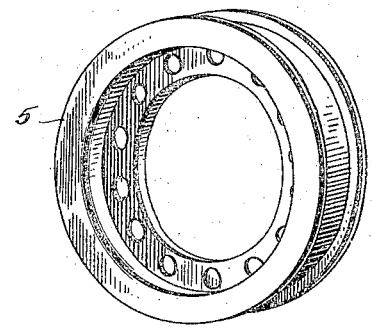
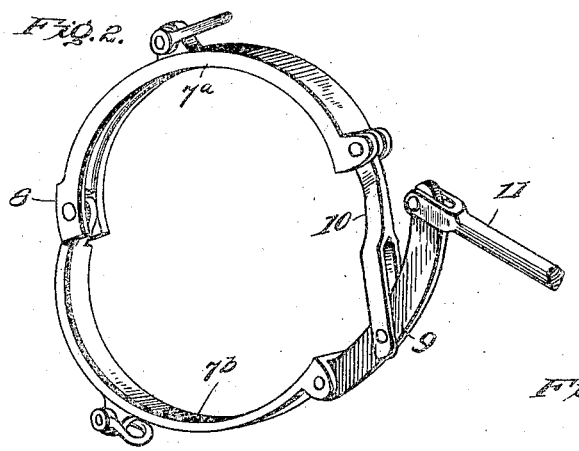
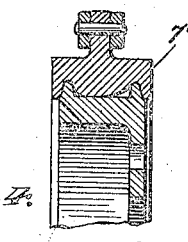
Witnesses
Inventor
J. W. Tapp,
By
Attorneys

UNITED STATES PATENT OFFICE.

JAMES W. TAPP, OF WICHITA, KANSAS.

BRAKE.

No. 817,942.

Specification of Letters Patent.

Patented April 17, 1906.

Application filed January 20, 1905. Renewed October 18, 1905. Serial No. 283,303.

*To all whom it may concern:*

Be it known that I, JAMES W. TAPP, a citizen of the United States, residing at Wichita, in the county of Sedgwick and State of Kansas, have invented certain new and useful Improvements in Brakes, of which the following is a specification.

This invention embodies a novel form of brake mechanism particularly designed for wagons, portable machines, or vehicles of any type.

The invention embodies improvements in friction-brakes of the type employing a rotating brake-wheel and coöperating brake-band, the construction of the friction devices being such as to give a maximum amount of braking action for the purpose of the invention.

Further, the invention includes a peculiar combination of friction brake means and the ordinary construction of brake mechanism utilizing a brake-beam and brake-shoes directly engaging the wheels.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features of the invention, still the preferred embodiment thereof is shown in the accompanying drawings, in which—

Figure 1 is a perspective view showing the rear portion of a vehicle, the invention being applied thereto. Fig. 2 is a perspective view of the brake-band and adjacent attaching devices. Fig. 3 is a detail perspective view of the brake-wheel. Fig. 4 is a vertical sectional view through a brake-wheel having the brake-band applied thereto, bringing out more clearly the form of the sections of the brake-band.

Corresponding and like parts are referred to in the following description and indicated in all the views of the drawings by the same reference characters.

In illustrating the application of the invention as when in actual use the rear portion of a wagon or similar vehicle is shown, the rear axle being indicated at 1, the adjacent hounds at 2, the wheel 3, and the hubs 4. The vehicle structure may be of any suitable type, as above premised.

The brake mechanism comprising the invention consists, primarily, of brake-wheels 5, which are attached to the hubs 4 of the wheels 3. The brake-wheels 5 are of circular formation, so as to receive the body of the hubs 4, and these wheels 5 are attached to the main or ground wheels of the vehicle by means of bolts or similar fastenings, which pass through openings 6 in the wheels 5 and engage with the spokes to accomplish the desired function of attachment with the brake members 5 aforesaid. It is contemplated that the brake-wheels 5, however, be secured for rotation with the ground-wheels 3 in any suitable manner, and the peripheral portion of each of these wheels 5 is preferably grooved.

Coöperating with each of the wheels 5 is a brake-band of peculiar formation, said band being of sectional construction. The sections of the band aforesaid are designated $7^a$ and $7^b$, and these sections are pivoted together at one end, as shown at 8. The opposite end of the sections $7^a$ and $7^b$ of the brake-bands are connected together in such a manner that the sections may be caused to frictionally bind against the brake-wheel 5 or loosely engage the same in their ordinary braking operation. A short lever 9 is pivoted at one end to the lower section $7^b$ of each brake-band, and this lever 9 is connected at a point between its ends with the upper section $7^a$ by means of a link 10. The end of the lever 9 opposite that pivotally connected with the lower section of the brake-band is operably connected with an actuating rod or bar 11, to which power is communicated in effecting the braking action of the brake-bands. The means for actuating the brake-bands may be of any suitable type, and for this purpose a shaft 12 is mounted upon the truck of the vehicle, upon the hounds in the construction shown, and this shaft is provided at opposite ends with crank-arms 13, with which the rod or bar 11, which actuates each brake-band, is connected. The shaft 12 is actuated by a lever or similar device convenient to the operator or driver of the vehicle, this latter mechanism not being shown, since it may be of any common and approved construction.

It will be noted that when the bar 11 is pulled or pushed rearwardly the lever 9 will be actuated thereby, so as to effect a closing movement of the sections of the band with relation to each other, so that such sections will bind against the brake-wheel and admit of application of the brakes in this manner. When the levers 9 are not actuated in the above manner, the same admit of free movement of the brake-wheels in the brake-bands in a manner readily apparent. It will be understood that when the vehicle is being backed the shaft 12 is operated to force the lever 9 in one direction, whereas when the vehicle is moving forward the said shaft is actuated to throw the lever 9 in the opposite direction in operating the brake mechanism. The provision of the lever 9 gives an increased amount of leverage at a very advantageous point with reference to the sections of the brake-bands, and the increased leverage thus obtained gives a great amount of power. The uppermost sections 7ª of the brake-bands are grooved upon the under sides thereof and are wider than the brake-wheels 5, with which they engage, in order to house the upper portions of the brake-wheels, and thereby prevent dust or like foreign matter from interfering with the proper frictional contact of the brake-bands with the said wheels 5.

The brake-bands are operably connected with a brake-beam 14, which is hung from the hounds 2 of the vehicle, preferably, said beam 14 being provided with the usual brake-shoes 15. The connections between the brake-beam 14 and the brake-bands are peculiar and consist of chains or similar devices 16, one of which connects the brake-beam 14 with one section of a brake-band, another of said chains or connections connecting the brake-beam with another of the sections of the brake-bands, so that the brake may be applied when the vehicle moves forward or is backed. The brake-beam 14 is connected with the brake-bands near its ends and the movement of the sections of the brake-bands in throwing the levers 9 forwardly is communicated to the brake-beam by means of the connections 16, above described. Thus when the vehicle is advancing and the levers 9 are forced forwardly the chains 16, connected with the lower sections of the brake-bands, are pulled rearwardly by binding of the bands, throwing the brake-shoes 15 against the wheels 3 in the usual manner, and the operation is the reverse when the levers 9 are pulled upon and the vehicle is being backed.

The general operation of the brake mechanism is clear from the foregoing description, and an essential feature of the invention is comprised in the structure of the various parts, whereby the same may be readily applied to almost any type of vehicle now in use, various parts of the invention being at the same time comparatively simple and economically constructed from the standpoint of cost and manufacture.

Having thus described the invention, what is claimed as new is—

1. In a brake, the combination of a brake-wheel, a brake-band coöperating therewith and composed of sections pivoted together at one end, a lever pivoted to the opposite end of one of the sections, a link connection between the lever and the other section, and means for operating the lever as specified.

2. In a brake, the combination of a brake-wheel, a brake-band composed of sections pivotally connected at one end and embracing the brake-wheel, a lever pivoted at one end to the opposite end of a section of the brake-band, a link pivoted at one end to the opposite end of the other section of the brake-band, said link being pivoted at its opposite end to the lever between the ends of the latter, and means connected with the end of the lever opposite that attached to the brake-band for actuating said lever.

3. In a brake, the combination of a brake-wheel, a brake-band therefor composed of sections, one of said sections being wider than the brake-wheel so as to house the same, and means for actuating the sections of the brake-band as specified.

In testimony whereof I affix my signature in presence of two witnesses.

JAMES W. TAPP. [L. S.]

Witnesses:
J. B. FISHBACK,
W. M. BARRINGER.